United States Patent Office 3,383,377
Patented May 14, 1968

3,383,377
PROCESSABILITY OF CONJUGATED DIENE POLYMERS CONTAINING CARBON-METAL BONDS BY TREATMENT WITH ACIDIC MATERIALS
Carl A. Uraneck and Gerald R. Kahle, Bartlesville, Okla., assignors to Phillips Petroleum Company, a corporation of Delaware
No Drawing. Filed Mar. 4, 1963, Ser. No. 262,335
14 Claims. (Cl. 260—94.7)

This invention relates to a process for preparing improved conjugated diene polymers. In one aspect, it relates to a process for preparing a conjugated diene polymer which has a reduced tendency to cold flow and which possesses improved processing characteristics.

A great deal of research work has been conducted in recent years with the object of producing improved rubbery polymers of conjugated diene. One of the products that has attracted widespread attention because of its superior properties is a polybutadiene containing a high percentage, e.g., at least 85 percent of cis-1,4-addition. Another polymer that has achieved considerable importance is a polybutadiene prepared by polymerizing 1,3-butadiene with an organolithium catalyst. The physical properties of these polymers are of such a nature that they are particularly suitable for the fabrication of automobile and truck tires and other rubbery articles for which conventional synthetic polymers have heretofore been comparatively unsatisfactory. However, it has been found that certain of the conjugated diene polymers, including cis-polybutadiene and organolithium-catalyzed polybutadiene, have a tendency to cold flow when in the unvulcanized or uncured state. It has recently been suggested that the tendency of conjugated diene polymers to cold flow can be eliminated or substantially reduced by treating the polymers during preparation with an organometal treating agent so as to obtain polymer products containing carbon-metal bonds. While this treating method is effective in reducing the tendency of the polymers to cold flow, it has been found that the products are often difficult to process. It is essential that a polymer be processable, for otherwise its use is seriously limited.

It is an object of this invention, therefore, to provide an improved method for processing conjugated diene polymers.

Another object of the invention is to provide a method for improving the processability of a conjugated diene polymer containing carbon-metal bonds.

Other and further objects and advantages of the invention will become apparent to those skilled in the art upon consideration of the accompanying disclosure.

In accordance with the present invention, it has now been discovered that the processability of a conjugated diene polymer containing carbon-metal bonds can be greatly improved if the polymer is treated with an acidic material or compound. Broadly speaking, the process of this invention comprises the step of mixing a conjugated diene polymer containing carbon-metal bonds with an acidic material. While conjugated diene polymers containing carbon-metal bonds have a reduced tendency to cold flow, they often possess a relatively high inherent viscosity and as a result are difficult to process. By treating the polymers with an acidic material, a product is produced that has an inherent viscosity in a processable range. While it is not intended to limit the invention to any particular theory, it is believed that treatment of the polymers with the acidic material breaks or cleaves the carbon-metal bonds.

The treatment of the conjugated diene polymers containing carbon-metal bonds can be accomplished in a variety of ways, but the preferred method is to add the acidic material to a solution of the polymer in a hydrocarbon solvent. The hydrocarbon solvent used can be similar to the hydrocarbon diluent employed in the polymerization process for preparing the polymers, and examples of these hydrocarbons are set forth hereinafter in the discussion regarding the polymerization process. It is also within the scope of the invention to admix the acidic material with the polymers per se. When following this procedure, any suitable mechanical mixer, such as roll mills or Banbury mixers, can be utilized.

An amount of the acidic material is added to the conjugated diene polymer as will provide a product having a desired inherent viscosity. The actual amount employed will vary within rather wide limits, depending upon the particular acidic material used, the amount of reduction in inherent viscosity desired, and the severity of the treating conditions. In general, the amount of the acidic material added is in the range of 0.1 to 50, preferably 1.0 to 25, parts by weight per 100 parts by weight of polymer. The treating period is usually in the range of 1 minute to 50 hours, preferably from 10 minutes to 25 hours. The temperature employed during the treatment is generally in the range of 25 to 150° C., preferably from 50 to 100° C. When the treatment of the polymer is carried out with the polymer in solution, it then becomes necessary to separate the polymer from the hydrocarbon solvent. This can be readily accomplished by methods that are well known in the art, e.g., by steam stripping or by coagulation of the polymer with an alcohol.

Any acidic material or compound can be employed as a treating agent in the practice of the present invention. While it is not desired to limit the invention to any particular theory in the choice of acidic materials, an acidic material is often defined as one that is capable of accepting electrons. In the practice of the present invention, it is preferred to employ an acidic material that is selected from the group consisting of halogens, acidic salts, acidic oxides, inorganic acids, organic acids, acid esters of inorganic acids, acid esters of organic acids, and mercaptans. Any of the halogens can be used, i.e., chlorine, fluorine, bromine and iodine. Suitable acidic salts include metal halides, such as silicon trichloride, silicon tetrachloride, silicon bromotrichloride, silicon tribromochloride, boron trichloride, bismuth trichloride, antimony tribromide, antimony pentachloride, lead tetrachloride, lead dibromide, lead difluoride, stannic chloride, aluminum chloride, zinc chloride, cadmium fluoride, mercuric bromide and mercuric oxychloride, as well as compounds such as aluminum sulfate, lead phosphate, bismuth orthophosphate, and the like. Other suitable acid salts are the organic halides, including chloro-, bromo-, iodo-, and fluoro-substituted organic halides, and the halides can be mono-, di-, tri- or tetra-substituted organic halides. The class of halides defined as monohalogen-substituted hydrocarbons having a maximum carbon chain length of not greater than 8 carbon atoms are often preferred since they are more easily handled in a commercial operation. Still more desirably, the organic halide is a lower alkyl monohalide having a maximum carbon chain length of not greater than 8 carbon atoms. Examples of these organic halides include ethyl bromide, propyl chloride, butyl bromide, butyl iodide, and pentyl fluoride. Other examples are 1,2- dibromoethane, 1,3-dibromopropane, 1,2,3-tribromopropane, 1,1-difluoroethane, and 1,4-diiodobutane. Other acyclic and cyclic halides as well as aromatic halides can also be employed. Examples of these compounds are 1,3-dichlorocyclohexane, benzyl chloride, 1,4-dichlorobenzene, 1-bromodecane, 2-chloro-4-methyloctane, cyclopentyl chloride, tetrachloroquinone (chloranil), and phenyl chloride. Also, alkenyl halides, such as allyl bromide, and alkynyl halides, such as propargyl chloride, can be used. Examples of acidic oxides include silica, alumina, boria, zinc oxide, stannic oxide, chromic oxide, molybdenum trioxide, sulfur dioxide, sulfur trioxide, phosphorus pentaoxide, phosphorus trioxide, lead monooxide, lead sesquioxide, tungsten trioxide, vanadium trioxide, and the like. Examples of inorganic and organic acids include hydrofluoric acid, hydrochloric acid, hydrobromic acid, hydroiodic acid, hydrocyanic acid, hydrothiocyanic acid, hydroselenocyanic acid, hydrotellurocyanic acid, hydroazidodithiocarbonic acid, hydrocyanic acid, phosphoric acid, sulfuric acid, stearic acid, propionic acid, acetic acid, dehydroabeitic acid, dodecylbenzenesulfonic acid, benzoic acid, and the like. Examples of suitable acid esters of inorganic and organic acids include methyl hydrogen sulfate, ethyl hydrogen sulfate, methyl diacid orthophosphate, ethyl acid orthophosphate, ethyl lauryl acid orthophosphate, ethyl trichloroacetate, methyl dichloroacetate, ethyl dibromopropionate, methyl p-toluene sulfonate, ethyl benzene sulfonate, and the like. Examples of mercaptans that can be used are 2-mercaptobenzothiazole, thiophenol, tertiary nonyl mercaptan, and the like. It is also within the scope of the invention to employ pseudohalogens, such as cyanogen, selenocyanogen, and azidocarbondisulfide, and pseudohalogen organocompounds, such as acetonitrile, ethyl isothiocyanate, dodecyl cyanate and isobutyronitrile, and the like.

In general, the present invention is applicable to the treatment of conjugated diene polymers containing carbon-metal bonds. While it is not intended to limit the invention to polymers prepared by a particular method, the invention is particularly applicable to the treatment of the products that are obtained by the process disclosed in the copending U.S. application of G. R. Kahle, Ser. No. 262,226, filed Mar. 1, 1963, and now abandoned. As disclosed in detail in this copending application, improved conjugated diene polymers having a reduced tendency to cold flow are prepared by polymerizing a conjugated diene with a catalyst system comprising an organometal compound, e.g., a catalyst formed by mixing an organometal and a heavy metal compound or an organolithium catalyst, and adding to the polymerization mixture certain organometal treating agent. The treating agents used correspond to the formula $R_4M$, wherein R is a hydrocarbon radical selected from the group consisting of vinyl, alkyl, cycloalkyl and aryl radicals, with at least two of the radicals being vinyl and with each of the remaining radicals preferably containing from 1 to 12 carbon atoms, and M is a metal selected from the group consisting of silicon, germanium, tin and lead. By adding the treating agent to the polymerization mixture prior to inactivation of the catalyst, the rubbery product obtained has a reduced tendency to cold flow. This reduction in the tendency of the polymer to cold flow is due to the formation of carbon-metal bonds. As mentioned hereinbefore, the products often have a relatively high viscosity which renders them difficult to process.

In the process of the copending application, the $R_4M$ treating agent is generally added to the polymerization mixture in an amount ranging from 0.005 to 5 millimoles per 100 parts by weight of monomer. The treating agent can be added per se, but it is generally preferred to charge it as a solution or suspension in a hydrocarbon, preferably a hydrocarbon similar to that used as a diluent in the polymerization. It is usually preferred to add an amount of the treating agent in the range of 0.01 to 1.0 millimole per 100 parts by weight of monomeric material. Examples of suitable $R_4M$ treating agents include tetravinylsilane, methyltrivinylsilane, diethyldivinylsilane, n-hexyltrivinylsilane, di-n-dodecyldivinylsilane, cyclohexyltrivinylsilane, diphenyldivinylsilane, methylphenyldivinylsilane, benzyltrivinylsilane, tetravinylgermanium, ethyltrivinylgermanium, dimethyldivinylgermanium, n-butyltrivinylgermanium, di-n-decyldivinylgermanium, cyclohexyltrivinylgermanium, benzyltrivinylgermanium, tetravinyltin, methyltrivinyltin, diethyldivinyltin, n-hexyltrivinyltin, di-n-dodecyltin, cyclohexyltrivinyltin, diphenyldivinyltin, methylphenyldivinyltin, benzyltrivinyltin, tetravinyllead, ethyltrivinyllead, dimethyldivinyllead, n-octyltrivinyllead, di-n-decyldivinyllead, cyclohexyltrivinyllead, diphenyldivinyllead, dibenzyldivinyllead, and the like. The $R_4M$ treating agent is added to the polymerization reaction mixture prior to quenching or shortstopping of the reaction. In one method of operation, the treating agent is charged initially and the polymerization is then carried out in the manner ordinarily employed with organometallic catalyst systems. Although any suitable charging procedure can be used, it is often preferred to add the monomer to a reactor containing diluent and thereafter introduce the catalyst and the $R_4M$ treating agent. This method is frequently utilized when the catalyst is one that is prepared by mixing an organometal compound with a heavy metal compound. However, the treating agent can be added to the polymerization mixture after polymerization has commenced or upon conclusion of the polymerization but prior to inactivation of the catalyst. When the latter procedure is followed, a sufficient contact time must be allowed in order to obtain the desired reduction in cold flow. The time will generally depend upon the temperature of the polymerization mixture and is usually in the range of 5 minutes to 100 hours. A suitable temperature range is from 50 to 250° F. with a temperature above 75° F. being preferred.

The polymers which are prepared according to the process of the copending application and which are treated with acidic materials in accordance with the present invention can be broadly defined as being polymers of conjugated dienes containing from 4 to 12, preferably from 4 to 8, carbon atoms per molecule and having carbon-metal bonds. Examples of monomers that can be used in the preparation of the polymers include 1,3-butadiene, isoprene, piperylene, 2,3-dimethyl-1,3-butadiene, 1,3-octadiene, 4,5-diethyl-1,3-octadiene, and the like. These conjugated dienes can be polymerized to form homopolymers or mixtures of the dienes can be polymerized to form copolymers. Conjugated diene polymers can also be prepared by polymerizing the dienes with one or more copolymerizable monovinylidene-containing monomers, such as styrene, 2-methylstyrene, vinylnaphthalene, or the like. Polybutadienes containing carbon-metal bonds and having outstanding properties can be prepared by adding the $R_4M$ treating agent to the polymerization mixture obtained by polymerizing 1,3-butadiene with a catalyst system selected from the group consisting of (1) a catalyst formed by mixing materials comprising an organometal and an iodine-containing component and (2) an organolithium catalyst.

The present invention is especially applicable to the treatment of an organolithium-catalyzed polybutadiene containing carbon-metal bonds. The polybutadienes prepared with an organolithium catalyst generally contain from 35 to 48 percent cis-1,4-addition, from 45 to 55 percent trans-1,4-addition, and from 6 to 10 percent 1,2-addition. Polybutadienes prepared with an organolithium catalyst and having an inherent viscosity in the range of 0.75 to 3 possess outstanding properties and, when treated with an $R_4M$ compound so as to provide carbon-metal bonds, have a reduced tendency to cold flow in the unvulcanized state.

Organolithium compounds suitable for use in the polymerization have the formula $RLi_x$, wherein R is a hydrocarbon radical selected from the group consisting of aliphatic, cycloaliphatic and aromatic radicals and $x$ is an integer from 1 to 4, inclusive. The R in the formula has a valence equal to the integer and preferably contains from 1 to 20, inclusive, carbon atoms, although higher molecular weight compounds can be utilized. In preparing the polybutadiene, it is often preferred to use an alkyllithium compound, such as n-butyllithium, as the catalyst. Examples of other suitable organolithium compounds include methyllithium, isopropyllithium, tert-octyllithium, n-decyllithium, phenyllithium, naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butene, 1,8-dilithio-3-decene, 1,4-dilithiobenzene, 1,5-dilithionaphthalene, 1,2-dilithio-1,2-diphenylethane, 9,10-dilithio - 9,10 - dihydroanthracene, 1,2-dilithio-1,8-diphenyloctane, 1,3,5-trilithiopentane, 1,5,15-trilithioeiscosane, 1,3,5-trilithiocyclohexane, 1,2,5-trilithionaphthalene, 1,3,5-trilithioanthracene, 1,3,5,8-tetralithiodecane, 1,5,10,20-tetralithioeicosane, 1,2,3,5-tetralithiocyclohexane, 1,2,3,5 - tetralithio-4-hexylanthracene, and the like.

The process used in preparing the organolithium-catalyzed polybutadiene can be conducted at a temperature in the range of −100 to 250° F., preferably at a temperature in the range of zero to 180° F. The polymerization reaction can be carried out under autogenous pressures. It is usually desirable to operate at a pressure sufficient to maintain the reaction mixture in the liquid phase. The polymerization is conducted in the presence of a hydrocarbon diluent similar to that employed in the cis-polybutadiene polymerization process as described hereinafter. The actual pressure used in the process will depend upon the particular diluent employed and the temperature at which the polymerization is to be conducted.

A polybutadiene having a desired inherent viscosity can be readily prepared by varying the concentration of the organolithium compound. For example, with a completely dry system and no other impurities present to destroy the organolithium compound, about 2.5 millimoles of catalyst per 100 grams of monomer is generally required to give a polymer having an inherent viscosity of 0.75, and about 0.30 millimole of catalyst per 100 grams of monomer is generally required for the production of a polymer having an inherent viscosity of 3.0. It has been found that for practical operations approximately 0.3 mhm. or more of catalyst is needed as a scavenger for the system.

The present invention is also particularly applicable to the treatment of a cis-polybutadiene containing carbon-metal bonds. The cis-polybutadiene can be prepared by polymerizing butadiene with a catalyst system that is formed by mixing materials comprising an organometal compound and iodine, present either in the free or combined state. This polymerization system produces a cis-polybutadiene having outstanding physical properties and a reduced tendency to cold flow when treated to provide carbon-metal bonds. The term "cis-polybutadiene" as used herein is intended to include a polybutadiene containing at least 85 percent cis 1,4-addition, e.g., from 85 to 98 percent and higher.

A cis-polybutadiene containing carbon-metal bonds can be prepared by adding a $R_4M$ treating agent to the polymerization mixture obtained by polymerizing 1,3-butadiene with any one of a large number of different stereospecific catalyst systems.

It is usually preferred to employ a catalyst which is selected from the group consisting of (1) a catalyst formed by mixing materials comprising an organometal compound having the formula $R'_mM'$, wherein $R'$ is an alkyl, cycloalkyl, aryl, alkaryl, aralkyl, alkylcycloalkyl, cycloalkylalkyl, arylcycloalkyl or cycloalkylaryl radical, $M'$ is aluminum, mercury, zinc, beryllium, cadmium magnesium, sodium or potassium, and $m$ is equal to the valence of the metal $M'$, and titanium tetraiodide, (2) a catalyst formed by mixing materials comprising an organometal compound having the formula $R'_nM''$, wherein $R'$ is an organo radical as defined above, $M''$ is aluminum, magnesium, lead, sodium or potassium, and $n$ is equal to the valence of the metal $M''$, titanium tetrachloride and titanium tetraiodide, (3) a catalyst formed by mixing materials comprising an organometal compound having the formula $R'_aM'''$, wherein R is an organo radical as defined above, $M'''$ is aluminum or magnesium and $a$ is equal to the valence of the metal $M'''$, a compound having the formula $TiX_b$, wherein X is chlorine or bromine and $b$ is an integer from 2 to 4, inclusive, and elemental iodine, (4) a catalyst formed by mixing materials comprising an organometal compound having the formula $R'_xM^{iv}$, wherein $R'$ is an organo radical as defined above, $M^{iv}$ is aluminum, gallium, indium or thallium, and $x$ is equal to the valence of the metal $M^{iv}$, a titanium halide having the formula $TiX_4$, wherein X is chlorine or bromine, and an inorganic halide having the formula $M^vI_c$, wherein $M^v$ is beryllium, zinc, cadmium, aluminum, gallium, indium, thallium, silicon, germanium, tin, lead, phosphorus, antimony, arsenic, and bismuth, and $c$ is an integer from 2 to 5, inclusive, and (5) a catalyst formed by mixing materials comprising an organo compound having the formula $R'_xM^{iv}$, wherein $R'$, $M^{iv}$ and $x$ are as defined above, titanium tetraiodide, and an inorganic halide having the formula $M^{vi}X_d$, wherein $M^{vi}$ is aluminum, gallium, indium, thallium, germanium, tin, lead, phosphorus, antimony, arsenic or bismuth, X is chlorine or bromine, and $d$ is an integer from 2 to 5, inclusive. The $R'$ radicals of the aforementioned formulas preferably contain up to and including 20 carbon atoms.

The following are examples of preferred catalyst systems which can be used to polymerize 1,3-butadiene to a cis 1,4-polybutadiene: triisobutylaluminum and titanium tetraiodide; triethylaluminum and titanium tetraiodide; triisobutylaluminum, titanium tetrachloride and titanium tetraiodide; triethylaluminum, titanium tetrachloride and titanium tetraiodide; diethylzinc and titanium tetraiodide; dibutylmercury and titanium tetraiodide; triisobutylaluminum, titanium tetrachloride and iodine; triethylaluminum, titanium tetrabromide, and iodine; n-amylsodium and titanium tetraiodide; phenylsodium and titanium tetraiodide; n-butylpotassium and titanium tetraiodide; phenylpotassium and titanium tetraiodide; n-amylsodium, titanium tetrachloride and titanium tetraiodide; triphenylaluminum and titanium tetraiodide; triphenylauminum, titanium tetraiodide and titanium tetrachloride; triphenylaluminum, titanium tetrachloride and iodine; tri-alpha-naphthylaluminum, titanium tetratriphenylaluminum, titanium tetraiodide and titanium tetrachloride and iodine; tribenzylaluminum, titanium tetraiodide; di-2-tolylmercury and titanium tetraiodide; tricyclohexylaluminum, titanium tetrachloride and titanium tetraiodide; ethylcyclopentylzinc and titanium tetraiodide; tri(3-isobutylcyclohexyl)aluminum and titanium tetraiodide; tetraethyllead, titanium tetrachloride and titanium tetraiodide; trimethylphenyllead, titanium tetrachloride and titanium tetraiodide; diphenylmagnesium and titanium tetraiodide; di-n-propylmagnesium, titanium tetrachloride and titanium tetraiodide; dimethylmagnesium, titanium tetrachloride and iodine; diphenylmagnesium, titanium tetrabromide and iodine; methylethylmagnesium, and titanium tetraiodide; dibutylberyllium and titanium tetraiodide; diethylcadmium and titanium tetraiodide; diisopropylcadmium and titanium tetraiodide; triisobutylaluminum, titanium tetrachloride, and antimony triiodide; triisobutylaluminum, titanium tetrachloride and aluminum triiodide; triisobutylaluminum, titanium tetrabromide, and aluminum triiodide; triethylaluminum, titanium tetrachloride and phosphorus triiodide; tri-n-dodecylaluminum, titanium tetrachloride, and tin tetraiodide; triethylgallium, titanium tetrabromide, and aluminum triiodide; tri-n-butylaluminum, titanium tetrachloride, and antimony triiodide; tricyclopentylaluminum, titanium tetrachloride, and silicon tetraiodide; triphenylaluminum, titanium tetrachloride, and gallium triiodide; triisobutylaluminum, titanium tetraiodide and tin tetrachloride; triisobutylaluminum, titanium tetraiodide and antimony trichloride; triisobutylaluminum, titanium tetraiodide and aluminum trichloride; triisobutylaluminum, titanium tetraiodide, and tin tetrabromide; triethylgallium, titanium tetraiodide, and aluminum tribromide; triethylaluminum, titanium tetraiodide, and arsenic trichloride; and tribenzylaluminum, titanium tetraiodide, and germanium tetrachloride.

The polymerization process for preparing cis-polybutadiene is generally carried out in the presence of a hydrocarbon diluent which is not deleterious to the catalyst system. Examples of suitable diluents include aromatic, paraffinic and cycloparaffinic hydrocarbons, it being understood that mixtures of these materials can also be used. Specific examples of hydrocarbon diluents include benzene, toluene, n-butane, isobutane, n-pentane, isooctane, n-dodecane, cyclopentane, cyclohexane, methylcyclohexane, and the like. It is often preferred to employ aromatic hydrocarbons as the diluent.

The amount of the catalyst employed in polymerizing 1,3-butadiene to a cis-polybutadiene can vary over a rather wide range. The amount of the organometal used in forming the catalyst composition is usually in the range of 0.75 to 20 mols per mol of the halogen-containing component, i.e., a metal halide with or without a second metal halide or elemental iodine. The mol ratio actually used in a polymerization will depend upon the particular components employed in the catalyst system. However, a preferred mol ratio is generally from 1:1 to 12:1 of the organometal compound to the halogen-containing component. When using a catalyst comprising an organometal compound and more than one metal halide, e.g., titanium tetrachloride and titanium tetraiodide, titanium tetrachloride or tetrabromide and aluminum iodide, the mol ratio of the tetrachloride or tetrabromide to the iodide is usually in the range of 0.05:1 to 5:1. With a catalyst system comprising an organometal compound, a titanim chloride or bromide and elemental iodine, the mol ratio of titanium halide to iodine is generally in the range of 10:1 to 0.25:1, preferably 3:1 to 0.25:1. The concentration of the total catalyst composition, i.e., organometal and halogen-containing component, is usually in the range of 0.01 to 10 weight percent, preferably in the range of 0.01 to 5 weight percent, based on the total amount of 1,3-butadiene charged to the reactor system.

The process for preparing cis-polybutadiene can be carried out at temperatures varying over a rather wide range, e.g., from −100 to 250° F. It is usually preferred to operate at a temperature in the range of −30 to 160° F. The polymerization reaction can be carried out under autogeneous pressure or at any suitable pressure sufficient to maintain the reaction mixture substantially in the liquid phase. The pressure will thus depend upon the particular diluent employed and the temperature at which the polymerization is conducted. However, higher pressures can be employed if desired, these pressures being obtained by some such suitable method as the pressurization of the reactor with a gas which is inert with respect to the polymerization reaction.

Various materials are known to be detrimental to the catalyst employed in preparing the conjugated diene polymers. The materials include carbon dioxide, oxygen and water. It is usually desirable, therefore, that the monomer and diluent be freed of these materials as well as other materials that may tend to inactivate the catalyst furthermore, it is desirable to remove air and moisture from the reaction vessel in which the polymerization is to be conducted. Upon completion of the polymerization reaction or upon conclusion of the period during which the $R_4M$ treating agent is contacted with the polymerization mixture, the polymerization mixture is then treated to inactivate the catalyst and recover the rubbery polymer containing carbon-metal bonds. A convenient method for accomplishing this result involves steam stripping the diluent from the polymer. In another suitable method, a catalyst-inactivating material, such as an alcohol, is added to the mixture so as to inactivate the catalyst and cause precipitation of the polymer. The polymer is then separated from the alcohol and diluent by any suitable means, such as decantation or filtration. It has been found to be advantageous to add an antioxidant, such as 4,4′-methylene-bis(2,6-di-tert-butylphenol), to the polymer solution prior to recovery of the polymer. The recovered polymer containing carbon-metal bonds and having a reduced tendency to cold flow is then treated in accordance with the present invention with an acidic material as described hereinbefore in order to provide a product which has improved processing characteristics.

A more compresensive understanding of the invention can be obtained by referring to the following illustrative examples which are not intended, however, to be unduly limitative of the invention.

EXAMPLE I

A series of runs was carried out in which a polybutadiene containing carbon-metal bonds was treated with several different acidic materials in accordance with the present invention. The following recipe was employed in preparing the polybutadiene containing carbon-metal bonds:

Recipe

| | |
|---|---|
| Butadiene, parts by weight | 100 |
| Cyclohexane, parts by weight | 780 |
| Dilithium methylnaphthalene, mhm.[1] | 2.0 |
| Tetravinyltin(TVT), mhm.[1] | 0.05 |
| Temperature, ° C. | 50 |
| Time, hrs. | 18 |

[1] Millimols per 100 parts by weight of butadiene.

In each of the runs, the procedure followed in preparing the polybutadiene containing carbon-metal bonds was to charge the cyclohexane diluent to a reactor bottle. The reactor was then purged with nitrogen after which butadiene and the dilithium methylnaphthalene were charged in that order. The reactor was then tumbled for 6 hours in a constant temperature bath at 50° C. The tetravinyltin was then added to the reactor, and tumbling at 50° C. was continued for 12 hours. At the end of that period, the reaction was terminated, and the polybutadiene was coagulated with a sufficient amount of isopropyl alcohol containing 10 weight percent antioxidant to give 1 part by weight of antioxidant per 100 parts by weight of polymer. Certain properties were determined on a portion of the recovered polymer while the remainder of the polymer was dissolved in cyclohexane (5 milliliters per gram of polymer). Separate portions of the resulting solution were treated with 3 different acidic materials for 24 hours at 50° C. The polymer was then coagulated with isopropyl alcohol, and certain properties were determined. The results of these runs are shown below in Table I.

TABLE I

| Run No. | Polymer Treatment | | Gel, percent [2] |
|---|---|---|---|
| | Compound used | Concentration, mhr.[1] | |
| 1 (Control) | None | | 9 |
| 2 | $SnCl_4 \cdot 5H_2O$ | 50 | 2 |
| 3 | $Cl_2$ | 100 | 0 |
| 4 | HCl | 66 | 0 |

[1] Millimols per 100 parts of rubber.
[2] Determined as described in footnote 2 of Table II.

It is seen from the data in the table that the control polymer contained considerable gel. Treatment with the acidic materials of the present invention resulted in a breaking of the carbon-tin bonds, thereby reducing the gel content.

EXAMPLE II

A series of runs was conducted in which 1,3-butadiene was polymerized in the presence of n-butyllithium (BuLi) and the polymerization mixture was treated with tetravinyltin (TVT). The recovered polybutadiene containing carbon-metal bonds was thereafter treated with various acidic materials in accordance with the present invention. The conversion obtained in each of the polymerization runs was 100 percent. The procedure followed in conducting the runs was essentially the same as that described in Example I. The materials used in the runs as well as the results obtained are shown below in Table II.

TABLE II

| Run No. | Mhm. | | Polymer Treatment | | Inherent Viscosity [1] | Gel, percent [1] |
|---|---|---|---|---|---|---|
| | BuLi | TVT | Compd used | Concn., mhr.[1] | | |
| 1 (Control) | 1.0 | 0.05 | None | | 3.06 | 0 |
| 2 | 1.0 | 0.05 | $SnCl_4 \cdot 5H_2O$ | 50 | 2.80 | 0 |
| 3 | 1.0 | 0.05 | $Cl_2$ | 100 | 2.55 | |
| 4 | 1.0 | 0.05 | HCl | 66 | 2.66 | 0 |
| 5 (Control) | 1.0 | 0.25 | None | | 3.21 | 0 |
| 6 | 1.0 | 0.25 | $I_2$ | 25 | 2.49 | 0 |
| 7 | 1.0 | 0.25 | $HgBr_2$ | 50 | ([3]) | ([3]) |
| 8 | 1.0 | 0.25 | $n\text{-}C_4H_9Br$ | 100 | 2.82 | 0 |
| 9 (Control) | 1.0 | 0.00 | None | | 2.17 | 0 |
| 10 | 1.0 | 0.00 | $SnCl_4 \cdot 5H_2O$ | 50 | 2.15 | 0 |
| 11 | 1.0 | 0.00 | $Cl_2$ | 100 | 2.16 | 0 |
| 12 | 1.0 | 0.00 | HCl | 66 | 2.18 | 0 |

[1] One-tenth gram of polymer was placed in a wire cage made from 80 mesh screen and the cage was placed in 100 ml. of toluene contained in a wide-mouth, 4-ounce bottle. After standing at room temperature (approximately 77° F.) for 24 hours, the cage was removed and the solution was filtered through a sulfur absorption tube of grade C porosity to remove any solid particles present. The resulting solution was run through a Medalia type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portion of the original sample.

[2] Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouth, 2-ounce bottle. A piece of folded quarter-inch hardware cloth in the bottom of the bottle supported the cage with minimum contact. The bottle containing the cage was weighed to the nearest 0.02 gram during a minimum 3-minute draining period after which the cage was withdrawn and the bottle again weighed to the nearest 0.02 gram. The difference in the two weighings is the weight of the cage plus the toluene retained by it, and by subtracting the weight of the empty cage from this value the weight of toluene retention is found, i.e., the cage calibration. In the gel determination, after the cage containing the sample had stood for 24 hours in toluene, the cage was withdrawn from the bottle with the aid of forceps and placed in the 2-ounce bottle. The same procedure was followed for determining the weight of swelled gel as was used for calibration of the cage. The weight of swelled gel was corrected by subtracting the cage calibration.

[3] Not measured. Visual observation indicated that there was a reduction in viscosity.

As seen from the data in Table II, in control runs 1 and 5 in which TVT was used, the polymers had a higher inherent viscosity than in control run 9 in which no TVT was present. This indicates that the polymers of runs 1 and 5 contained carbon-metal bonds. Comparison of the data for runs 2–4 with those for run 1 and of the data for runs 6–8 with those for run 5 indicates that treatment with the acidic materials of the polymers that had been treated with TVT resulted in the breaking of carbon-tin bonds and a resultant reduction in viscosity. Comparison of the data for runs 10–12 with those for run 9 indicates that the compounds of this invention have no effect on the viscosity of polymers which were not treated with TVT.

EXAMPLE III

A run was carried out in which 1,3-butadiene was polymerized in the presence of n-butyllithium and the resulting polymerization mixture was treated with tetravinyltin. In the run, 1.0 mhm. of catalyst and 0.25 mhm. of the tetravinyltin were used. The procedure followed in the run was essentially the same as that described in Example I except that a polymerization time of 19 hours was used and the tetravinyltin was added to the reactor initially. In this run, 100 percent of the butadiene was converted to a gel-free polymer having an inherent viscosity of 3.23. Samples of the polymer, which were all gel-free, were treated according to the following procedures:

A. Mill-mixed with compounds of this invention for 10 minutes at 82° C.
B. Samples from procedure A heat-treated at 100° C. for 24 hours.
C. Samples from procedure A dissolved in 12.5 ml. cyclohexane per gram of polymer, tumbled in a 50° C. constant temperature bath for 24 hours, and coagulated with isopropyl alcohol.

The results obtained are shown below in Table III.

TABLE III

| Run No. | Polymer Treatment | | Inherent Viscosity [1] | | |
|---|---|---|---|---|---|
| | Compd. used | Concn., phr. | Procedure A | Procedure B | Procedure C |
| 1 | None (Control) | | 3.16 | 2.60 | 2.98 |
| 2 | do | | No | No | 2.94 |
| 3 | Stearic acid | 5 | 2.96 | No | 2.94 |
| 4 | Zinc oxide | 10 | 2.85 | 2.28 | 2.74 |
| 5 | Resin 731D[2] | 5 | 2.91 | No | 2.83 |
| 6 | Chloranil[3] | 5 | 2.31 | No | No |
| 7 | ELAP[4] | 5 | 2.31 | No | 2.36 |
| 8 | MBT[5] | 5 | 2.93 | No | 2.71 |
| 9 | DBS[6] | 5 | 2.49 | No | No |
| 10 | $SnCl_4 \cdot 5H_2O$ | 5 | 2.41 | No | No |

[1] See appropriate footnote to Table II.
[2] Modified rosin produced by catalytic disproportionation and having a high content of dehydroabietic acid.
[3] Tetrachloroquinone.
[4] Ethyl lauryl acid orthophosphate.
[5] 2-mercaptobenzothiazole.
[6] Dodecyl benzene sulfonic acid.

The data of runs 1 and 2 show the changes in viscosity resulting from the treating procedures in the absence of compounds of this invention; these are the control viscosities for comparison with the data from the other runs. It is seen that treatment with the acidic materials of this invention resulted in decreasing the inherent viscosities of the polymers. This decrease in viscosity occurred regardless of the procedure employed in treating the polymers.

EXAMPLE IV

Butadiene was polymerized as in Example I except that 1.3 mhm. of lithium-para-lithiothiophenolate was used as catalyst and 0.40 mhm. of tetraallyltin was used as the metal-containing compound. Conversion was 98.8 percent to a gel-free product having an inherent viscosity of 2.11 and a Mooney value of 92. The Mooney values (ML-4 at 212° F.) in this example and in Example V were determined according to the method of ASTM D1646-61. On milling only crumbing occurred and the polymer would neither band nor break down. Commercial phosphoric acid (85 percent $H_3PO_4$) was added dropwise until a total of 14.4 phr. had been added. Banding occurred at 115° C., and the polymer broke down rapidly and banded very well on the front roll. After breakdown, the polymer also banded well at room temperature on the front roll. The polymer after breakdown had an inherent viscosity of 1.43, a Mooney value of 9.5, and was gel-free. It is seen that the treated polymer possessed excellent milling characteristics.

EXAMPLE V

Butadiene was polymerized as in Example I using 1.4 mhm. of the same catalyst used in Example IV and the same concentration of the same tin compound. Conversion was 87.2 percent to a gel-free product having an inherent viscosity of 2.35 and a Mooney value of 95. Seven parts of this polymer was dissolved in 100 parts of cyclohexane, 5 phr. of $SnCl_4 \cdot 5H_2O$ was added, and the mixture was tumbled for 24 hours at 50° C. After coagulation with isopropyl alcohol, the recovered polymer was milled to breakdown and found to be gel-free and to have an inherent viscosity of 1.67 and a Mooney value of 9.2. These data show that the treated polymer had good milling characteristics.

EXAMPLE VI

A cis-polybutadiene having carbon-tin metal bonds was prepared by charging tetravinyltin to a system for a polymerizing butadiene in the presence of a catalyst formed by mixing triisobutylaluminum, titanium tetrachloride and iodine. The polybutadiene product obtained contained about 95 percent cis-1,4-addition. The following recipe was used:

Recipe

| | |
|---|---|
| 1,3-butadiene, parts by weight | 100 |
| Toluene, parts by weight | 1000 |
| Triisobutylaluminum, mhm.[1] | 2.6 |
| Iodine, mhm.[1] | 0.76 |
| Titanium tetrachloride, mhm.[1] | 0.43 |
| Tetravinyltin (TVT), mhm.[1] | 0.4 |
| Temperature, ° F. | 41 |
| Time, hours | 72 |
| Conversion, percent | 100 |

[1] Millimoles per 100 parts of butadiene.

The procedure followed in the run was to charge the toluene first, after which the reactor was purged with nitrogen. Butadiene was then added, followed by the tetravinyltin (0.1 molar solution in n-pentane), triisobutylaluminum, iodine, and titanium tetrachloride in that order. The last three of the named ingredients were charged as toluene solutions. At the conclusion of the polymerization, the reaction was shortstopped with isopropyl alcohol to which was added the antioxidant 2,2-methylene-bis(4-methyl-6-tert-butylphenol) dissolved in a 50/50 volume mixture of isopropyl alcohol and toluene. One part by weight per 100 parts polymer of the antioxidant was used. The product was coagulated with isopropyl alcohol, separated and dried. The product had an inherent viscosity of 3.18 and contained no gel.

Samples of this polymer are dissolved in cyclohexane (7 parts of polymer in 100 parts of cyclohexane), and to the resulting solutions there is then added 5 phr. of $SnCl_4 \cdot 5H_2O$, 4 phr. of silicon tetrachloride or 5 phr. of ethyl bromide. The resulting mixtures are then tumbled for 18 hours at 50° C. After coagulation with isopropyl alcohol, each of the recovered polymers is milled to breakdown and is found to be gel free and to have an inherent viscosity about half that of the untreated polymer.

As will be evident to those skilled in the art, many variations and modifications of the invention can be practiced in view of the foregoing disclosure. Such variations and modifications are believed to come within the spirit and scope of the invention.

We claim:

1. A process for improving the processability of a conjugated diene polymer containing carbon-tin bonds which comprises mixing said polymer with an acidic material.

2. A process for improving the processability of a conjugated diene polymer containing carbon-tin bonds which comprises mixing said polymer with an acidic material selected from the group consisting of halogens, acidic salts, acidic oxides, inorganic acids, organic acids, acid esters of inorganic acids, acid esters of organic acids and mercaptans, said mixing occurring at a temperature in the range of 25 to 150° C. for a period in the range of 1 minute to 50 hours.

3. A process according to claim 2 in which said mixing occurs at a temperature in the range of 50 to 100° C. for a period in the range of 10 minutes to 25 hours.

4. A process according to claim 2 in which said acidic material is tin tetrachloride.

5. A process according to claim 2 in which said acidic material is chlorine.

6. A process according to claim 2 in which said acidic material is hydrochloric acid.

7. A process according to claim 2 in which said acidic material is iodine.

8. A process according to claim 2 in which said acidic material is chloranil.

9. A process for improving the processability of a cis-polybutadiene containing carbon-tin bonds which comprises mixing said cis-polybutadiene within the range of 0.1 to 50 parts by weight per 100 parts by weight of said cis-polybutadiene of an acidic material selected from the group consisting of halogens, acidic salts, acidic oxides, inorganic acids, organic acids, acid esters of inorganic acids, acid esters of organic acids and mercaptans, said mixing occurring at a temperature in the range of 25 to 150° C. for a period in the range of 1 minute to 50 hours.

10. A process according to claim 9 in which said acidic material is added to a solution of said polymer in a hydrocarbon solvent and in which the resulting treated cis-polybutadiene is recovered from solution at the end of said mixing period.

11. A process according to claim 9 in which said cis-polybutadiene containing carbon-tin bonds is prepared by treating a polymerization mixture containing cis-polybutadiene with a compound having the formula $R_4Sn$, wherein R is selected from the group consisting of vinyl, alkyl, cycloalkyl and aryl radicals, at least two of said radicals being vinyl.

12. A process for improving the processability of a polybutadiene prepared with a lithium based catalyst and containing carbon-tin bonds, said process comprising the steps of mixing said polybutadiene within the range of 0.1 to 50 parts by weight per 100 parts by weight of said polybutadiene of an acidic material selected from the group consisting of halogens, acidic salts, acidic oxides, inorganic acids, organic acids, acid esters of inorganic acids, acid esters of organic acids and mercaptans, said mixing occurring at a temperature in the range of 25 to 150° C. for a period in the range of 1 minute to 50 hours.

13. A process according to claim 13 in which said acidic material is added to a solution of said polybutadiene in a hydrocarbon solvent and in which the resulting treated polybutadiene is recovered from solution at the end of said mixing period.

14. A process according to claim 13 in which said polybutadiene containing carbon-tin bonds is obtained by treating a polymerization mixture, prepared by polymerizing 1,3-butadient with a lithium based catalyst, with a compound having the formula $R_4Sn$, wherein R is selected from the group consisting of vinyl, alkyl, cycloalkyl and aryl radicals, at least two of said radicals being vinyl.

References Cited

UNITED STATES PATENTS

| | | | |
|---|---|---|---|
| 2,448,391 | 8/1948 | Pyle | 260—80 |
| 2,873,287 | 2/1959 | Ramsden | 260—80 |
| 2,985,631 | 5/1961 | Jones et al. | 260—80.5 |
| 3,084,084 | 4/1963 | D'Alelio | 260—94.2 |
| 3,135,716 | 6/1964 | Uraneck et al. | 260—78.4 |
| 3,182,052 | 5/1965 | Naylor | 260—94.3 |

OTHER REFERENCES

Rochow, E. G., Hurd, D. T., and Lewis, R. N.: The Chemistry of Organometallic Compounds, Wiley, N.Y. (1957).

JOSEPH L. SCHOFER, *Primary Examiner.*

H. I. CANTOR, H. WONG, JR., *Assistant Examiner.*

UNITED STATES PATENT OFFICE
CERTIFICATE OF CORRECTION

Patent No. 3,383,377                                    May 14, 1968

Carl A. Uraneck et al.

It is certified that error appears in the above identified patent and that said Letters Patent are hereby corrected as shown below:

Column 12, lines 66 and 71, "claim 13", each occurrence, should read -- claim 12 --.

Signed and sealed this 20th day of January 1970.

(SEAL)

Attest:

Edward M. Fletcher, Jr.  
Attesting Officer

WILLIAM E. SCHUYLER, JR.  
Commissioner of Patents